US00RE36462E

United States Patent [19]

Chang et al.

[11] E Patent Number: Re. 36,462

[45] Reissued Date of Patent: Dec. 21, 1999

[54] METHOD TO CONTROL PAGING SUBSYSTEM PROCESSING IN VIRTUAL MEMORY DATA PROCESSING SYSTEM DURING EXECUTION OF CRITICAL CODE SECTIONS

[75] Inventors: Albert Chang, Yorktown Hts.; Mark F. Mergen, Mt. Kisco, both of N.Y.; John T. O'Quin, II, Austin, Tex.; John C. O'Quin, III, Austin, Tex.; Mark D. Rogers, Austin, Tex.

[73] Assignee: International Business Machines Corporation, Armonk, N.Y.

[21] Appl. No.: 08/726,565

[22] Filed: Oct. 4, 1996

Related U.S. Patent Documents

Reissue of:

[64] Patent No.: 4,718,008
Issued: Jan. 5, 1988
Appl. No.: 08/819,459
Filed: Jan. 16, 1986

U.S. Applications:

[

[63] Continuation of application No. 07/461,569, Jan. 5, 1990, abandoned.

[51] Int. Cl.[6] ..... G06F 9/00; G06F 12/00

[52] U.S. Cl. ..... 711/209; 364/222.82; 364/254.3; 364/256.3; 364/DIG. 1

[58] Field of Search ..... 395/419, 427; 711/209

[56] References Cited

U.S. PATENT DOCUMENTS

| | | | |
|---|---|---|---|
| 4,355,360 | 10/1982 | Asano et al. | 364/900 |
| 4,403,283 | 9/1983 | Myntti et al. | 364/200 |
| 4,418,385 | 11/1983 | Bourez | 395/725 |
| 4,422,145 | 12/1983 | Sacco et al. | 711/160 |
| 4,742,450 | 5/1988 | Duvall et al. | 364/200 |
| 4,748,586 | 5/1988 | Bonci | 364/900 |
| 4,761,737 | 8/1988 | Duvall et al. | 364/200 |
| 4,800,489 | 1/1989 | Moyer et al. | 364/200 |
| 4,805,097 | 2/1989 | De Sanna | 364/200 |
| 4,868,738 | 9/1989 | Kish et al. | 364/200 |
| 4,930,068 | 5/1990 | Katayose et al. | 364/200 |

*Primary Examiner*—Kevin J. Teska
*Assistant Examiner*—Ayni Mohamed
*Attorney, Agent, or Firm*—Robert M. Carwell; Kenneth C. Hill; Andrew J. Dillon

[57] ABSTRACT

A method to logically serialize a plurality of independent system events in a virtual memory data processing system. Each event causes interrupt servicing routines to be executed and requires data structures that record the status of virtual pages to be updated. The system events include the interrupt that is generated as a result of a page fault, the interrupt that is generated as a result of a paging I/O completion operation that resolves a page fault, and lastly interrupts generated in response to a supervisory call to a paging service.

22 Claims, 8 Drawing Sheets

METHOD TO CONTROL PAGING SUBSYSTEM PROCESSING IN VIRTUAL MEMORY DATA PROCESSING SYSTEM DURING EXECUTION OF CRITICAL CODE SECTIONS

Matter enclosed in heavy brackets [ ] appears in the original patent but forms no part of this reissue specification; matter printed in italics indicates the additions made by reissue.

*This is a continuation of application Ser. No. 07/461,569, filed Jan. 5, 1990, now abandoned.*

FIELD OF INVENTION

This invention relates in general to methods for handling page faults in large virtual memory data processing systems and, in particular, to an improved method for logically serializing responses to system events that cause the states of virtual pages and page frames in real memory to be changed.

CROSS-REFERENCED APPLICATIONS

U.S. application Ser. No. 817,457, filed concurrently herewith in the name of O'Quin et al, entitled "Method to Operate On Large Segements of Data in a Virtual Memory Data Processing System", and assigned to the same assignee as this application discloses and claims a method for operating on large segments of data in a paged segmented virtual memory data processing system.

BACKGROUND ART

The prior art discloses various data processing systems which employ a virtual memory arrangement for storing information. Virtual storage extends the power of computer storage by expanding the number of storage addresses that can be represented in a system while relieving the limitation that all addressable storage must be present in the main memory of the system. The address translation mechanism, which functions to translate a virtual address to an address in real memory requires data structures such as page tables fixed in memory to perform the address translation function.

In some prior art systems, the size of the conventional page table is proportional to the size of the virtual address space which places a practical limit on the number of address locations in virtual memory which, in turn, effectively limits the size or storage capacity of the virtual memory.

Other prior art systems employ a technique referred to as "paged segmentation" for the virtual memory. The cross-referenced application describes a virtual memory which employs a paged segmentation technique. In that arrangement, the effective address space was divided into 16 equal sized segments by the memory management unit, and the 32 bit effective address generated by the processor was converted to a 40 bit virtual address by using 4 bits of the effective address to select 1 of 16 segment registers each of which stores a 12 bit segment identifier. The 12 bit segment identifier concatenated with the 28 bit segment offset comprises the 40 bit virtual address which defines one addressable location for one byte of data. The division of the virtual address space into segments, and then into pages, is what is referred to as "page segmentation."

A segment stores an object such as program a mapped file, or computational data. A data structure referred to as the segment table defines the objects that can be currently referenced by the system, and provides information such as the object size and the location where its external page table is stored. The external page table for the segment has one entry for each page in the segment. Page segmentation is a means of improving the overall operation of the memory system. It takes advantage of the grouping of related data in virtual storage by representing page table data, specifically for each segment. This allows space savings for short or unused segments. The other data structure used by prior art systems is the inverted page table. An inverted page table further expands the range of addressability by reducing the real storage overhead required to support a very large virtual address space. Since an inverted page table contains one entry for each page of real memory, its overhead is proportional to the physical, rather than virtual memory size. This makes it feasible to map a system's entire data base using a single set of virtual addresses (the "one level store"). With a one level store, each segment can be large enough to represent an entire file or collection of data.

This is possible because the address translation hardware only needs the location of pages that are present in real memory. If a page is not present, the hardware must detect this fact, but it does not require a backing store address. The system's paging subsystem does need this information, however. Hence, the paging subsystem must keep this information in some data structure, such as the external page table that is associated with the page. Unless this data structure is pageable, the advantage of the inverted page table is lost because the pinned real storage requirements become proportional to virtual memory size.

The function of the paging subsystem is fundamentally to manage pages of virtual memory and page frames of real memory. Each of these items will have well defined states which change as they are processed through the system. The data structures that keep track of these states must be updated to reflect each changed state. Since independent system events can cause the state of a page or page frame to be changed, it is important to ensure that the state changes caused by one system event are reflected in the appropriate data structures before the next system event is permitted to execute a state change.

In other words, the system events that change page states and require updates to data structures that reflect states of pages and page frames, must be logically serialized. Such events depend to some extent on the architecture of the system, particularly the memory management function and the page fault mechanism, but generally fall into three categories:

(1) page fault interrupts;

(2) paging I/O completion interrupts;

(3) supervisory calls to paging services, i.e., creating or destroying a segment.

Without this serialization, the integrity of the data structures could not be guaranteed.

A virtual machine, virtual memory type data processing system is described in the cross-referenced applications and is generally the type of system in which the method of the present invention may be employed to insure that the system events that change or update data structures that store the current status of the virtual pages and page frames are logically serialized so that the integrity of these data structures is maintained. The general architecture of that system is similar to prior art systems from the standpoint of the need to serialize those system events that cause data structures to be changed in order to reflect the current state of pages and page frames.

Briefly, in systems of the above type, pages can assume a plurality of different states, such as the five states described below.

(1) new

The virtual page is known to be all zeros. Each virtual page is initialized to this state when a segment is created or increased in size (2) accessible The virtual page may be accessed without resulting in a page fault. This is the only page state that allows a virtual page to be accessed without resulting in a page fault.

(3) hidden

The virtual page is hidden from program access and any access to the page will result in a page fault.

(4) on disk

The virtual page is only valid on disk. It does not have a page frames assigned to it.

Page frames can also assume a plurality of different states, such as the four described below.

(1) in use

Page frames in this state are assigned to a virtual page.

(2) free

Page frames in this state are free to be assigned to a new virtual page.

(3) page-in

Page frames with page-in I/O in progress.

(4) page-out

Page frames with page-out I/O in progress.

Data structures employed by these systems to maintain the current status of virtual pages and page frames include, for example, a segment table, an External Page Table, and an Inverted Page Table. These structures generally have the following functions:

Segment Table

The Segment Table (SIDTABLE) contains information describing the active segments. The table is pinned in real memory and its size is predetermined. The segment table must be altered only in a Paging Subsystem critical section.

External Page Table

The External Page Table (XPT) describes how a page is mapped to the disk There is one XPT entry for each defined page of virtual memory. The XPT entries for a segment are allocated as continuous entries when the segment is created. The virtual page number is the index into the XPT table. The XPT must be altered only in a Paging Subsystem critical section.

Inverted Page Table

The Inverted Page Table (IP) describes the relationship between virtual addresses and real addresses. The IPT consists of two arrays. The first one is primarily defined by the translation hardware, and contains the information that controls the translation function. The second array contains the Virtual Memory Manager page state information, used to control page fault processing. It is pinned, and its size is determined by the real memory size which is set at the Initial Program Load time (IPL). The real page number is the index into the IPT. It must be altered in a virtual memory critical section. Each real page frame has an entry in the IPT.

The following lists link associated page frames in the IPT.

There is one main list for each valid segment. This list links together all of the page frame assigned to the segment with a valid virtual address.

There is one system-wide free list that links together the pages that may be reassigned. Accesses to pages on this list will always result in a page fault. Pages may be on both the main list and free list.

There is one system-wide I/O list that links together all of the pages currently being read or written to the disk. Accesses to pages on this list will also result in a page fault.

A process is either blocked, synchronous page fault processing, or allowed to dispatch another subtask, asynchronous page fault processing, when I/O is required to process one of its page faults.

A Process Control Block (PCB) contains the information describing the state of the process. It is used by the paging subsystem to save the states of a process for synchronous page fault processing.

A Notification Control Block (NCB) contains the information required to notify a virtual machine of the completion of an asynchronously paging request. The asynchronous request can be either a purged page range Service Call (SVC), or a page fault when asynchronous acknowledgement is allowed. An NCB is a self-describing control block in the system control block area. Like some of the previous structures, it must be altered in a critical section.

There is one page I/O wait list for each page frame in the system. A PCB or NCB is placed in a page's I/O wait list when it reclaims a page with I/O in progress or it initiates a page in I/O as a result of a page fault.

There is one global system free page frame wait list. It links together NCBs and PCBs for the processes that are waiting for a free page frame. A process is placed on this list when it requires a free page frame and there is not one available.

Lastly, there is one global system page I/O wait list. It links together the NCBs and PCBs for the processes that are waiting for all page-out 1/0 less than or equal to a specific page I/O level. A process is placed on this list by several service calls to ensure that the contents of the disk match the contents in memory.

The section of the paging subsystem code where state changes can occur is referred to as a critical sections. A page fault can occur in a critical section potentially, since one of the data structures that needs to be updated in the external page table which, as stated previously, is made pageable in order to not restrict the virtual address space.

The manner in which the paging subsystems in these critical sections are synchronized and handled to ensure that the integrity of the data structures, such as the external page table that reflect the various states of a virtual page or page frame, are the subjects of the present invention.

SUMMARY OF THE INVENTION

In accordance with the method of the present invention, system events, such as page fault interrupts, paging I/O completion interrupts, and supervisory calls to paging services, that alter page states are serialized in the following manner.

If a page fault occurs within a critical section of the paging subsystem, the page fault handler will get control and run its critical section. The potential serialization problem this introduces is resolved efficiently by back-tracking. (Back-tracking is the restarting of the critical section at a predetermined point, typically the start, that is not the point of interruption.) Paging subsystem critical sections which need to touch data that may not be present in main storage are run in a "backtracking state." On entry to the critical section, a process state is established, at which point execution will be resumed if a page fault occur Code running in a critical section is pinned, (Le., it cannot be paged out), along with its local data, so faults can occur only on pageable global data.

Since faulting within a critical section causes backtracking, the first time pageable data are touched is potentially an exit from the critical section. All global data must be in a consistent state whenever an exit from the critical section can occur. This requires care on the part of the programmer, but the code is usually straightforward. This care is referred to as "careful update". Typically, the program reads global data, some of it is pageable, decides what to do based on current state information, and then makes changes to the data structures to reflect the new state. When making changes to these data, the program must "touch" all relevant pageable data before making any changes. The "touch" function is merely a function which checks to see if the page is in real memory, and if not, to page fault and bring the required page into real memory. Once a page has been touched within a critical section, it will remain unless it is paged out by that critical section. No other critical section can gain control and change the page's state. When a critical section page faults and backtracks, any pages that had already been touched will have been referenced but not locked. Different processes cannot deadlock by holding on to page frames while waiting on another virtual page to be transferred into main memory. Each time a faulting process is redispatched, it begins again, rechecking all relevant page states.

Touching a page while in a back-track state is sufficient to ensure that it is accessible. This feature drastically reduces the number of page states that must be considered within some critical sections. It allows many unusual state transitions to be isolated in the page fault handler.

Page fault interrupts are never disabled. The page fault interrupt handler runs with hardware I/O interrupts enabled and paging dequeue interrupts disabled If a page fault interrupt occurs while the paging subsystem is in a back-track state, the machine state at the time of the interrupt is discarded and the process will be resumed with whatever state was saved on entry to the original critical section.

Normal page faults (not in a back-track state), cause the process state at the time of the interrupt to be saved. Since the page fault handler may page fault on the external page tables, it establishes a back-track state at this time. If the interrupt handler should fault, its state will be discarded, as is normal in a back-track state. The interrupt handler will be called again immediately to fix its own page fault. When this fault is resolved and the process is re-dispatched, it will re-execute the original faulting instruction. Most likely, this will fault again, but this time the page fault handler will probably find the page that caused the back-track page fault in memory.

Surpervisor calls for specific services, such as creating or deleting a segment, are processed as follows. When a paging service requested by a virtual machine must change global subsystem data, it establishes a back-track state at the entry to its critical section and runs with paging dequeue interrupts disabled. If a fault occurs, the process state is discarded. After the fault is fixed, the process will be resumed at the entry to its critical section.

When a paging I/O request completes, it is necessary to run a critical section that updates the states of the page and its frame. Since the I/O interrupt may occur during a paging critical section, some mechanism is required to delay running the paging I/O completion critical section until all paging data structures are in a consistent state. In accordance with the improved method of this invention, the I/O interrupt handlers simply appends the dequeue request to a list and sets a software latch, requesting a lower priority interrupt level The paging critical section will then be executed by the interrupt handler for this paging dequeue level.

During paging critical section, hardware I/O interrupts may remain enabled, but paging dequeue interrupt requests remain pending until that level is enabled on exit from the critical section. Because it has lower priority, this interrupt request will remain pending until after the initiating I/O interrupt handler terminates. Since the page fault handler runs with dequeue interrupts disables, back-track page faults are processed immediately, the dequeue interrupts remain pending until after the back-track fault is processed.

As soon as dequeue interrupts are enabled, the paging I/O completion interrupt handler will update the page tables. Normally, it is not necessary for an I/O completion critical section to backtrack. it is likely that updates can be confined to pinned data, such as the inverted page table.

When paging dequeue interrupts are inhibited, process switching is also disabled. Coding the critical section to mimic an interrupt level will bypass dispatching a new process in the interrupt return path. This prevents a process running a paging critical section from being preempted by another process which might attempt to enter a paging critical section.

The method of the present invention is most advantageously employed in a system where the hardware provides dynamic address translation for virtual storage and the process is re-startable after a page fault, so demand paging can be supported.

The primary advantage of allowing faults within paging subsystem critical sections is gained when the hardware does not force external page tables to be pinned. This is achieved with an inverted page table or some other means, as long as the hardware allows faults on the page tables.

The paging dequeue interrupt level works best when the machine provides multiple interrupt levels that can be enables selectively. Software should be able to request an interrupt that is subject to the usual interrupt priority code, and remains pending until the requested level is enabled. This feature could be emulated in software, but performance might be affected.

I/O interrupts for non-paging devices are enabled during paging critical sections. Since interrupt handlers are not permitted to page fault, they can preempt paging critical sections without cuasing problems. If it is desired that I/O interrupt handlers be able to unpin buffers or other data, then the pin and unpin routines must disable I/O interrupts while updating the pin count word in the IPT. This is sufficient, because pinned pages and their frames cannot change state and, hence, no interrupted critical section will be modifying their table entries.

It is, therefore, an object of the present invention to provide an improved method for use in a virtual memory system for ensuring the integrity of pageable data structures that reflect the current states of virtual pages and page frames.

Another object of the present invention is to provide an improved method for use in a virtual memory system for logically serializing system events that cause a change in the state of a virtual page or a page frame in real memory when the data structures that function to keep track of page and page frame states are also pageable. A further object of the present invention is to provide an improved method for serializing system events in a demand paging system having a page segmented virtual memory in which the external page tables are pageable and in which critical sections of the paging subsystem do not inhibit normal I/O interrupts Objects and advantages other than those mentioned above will become apparent from the following description when read in connection with the drawing.

DESCRIPTION OF THE PREFERRED EMBODIMENT

System Overview

Figure 1:
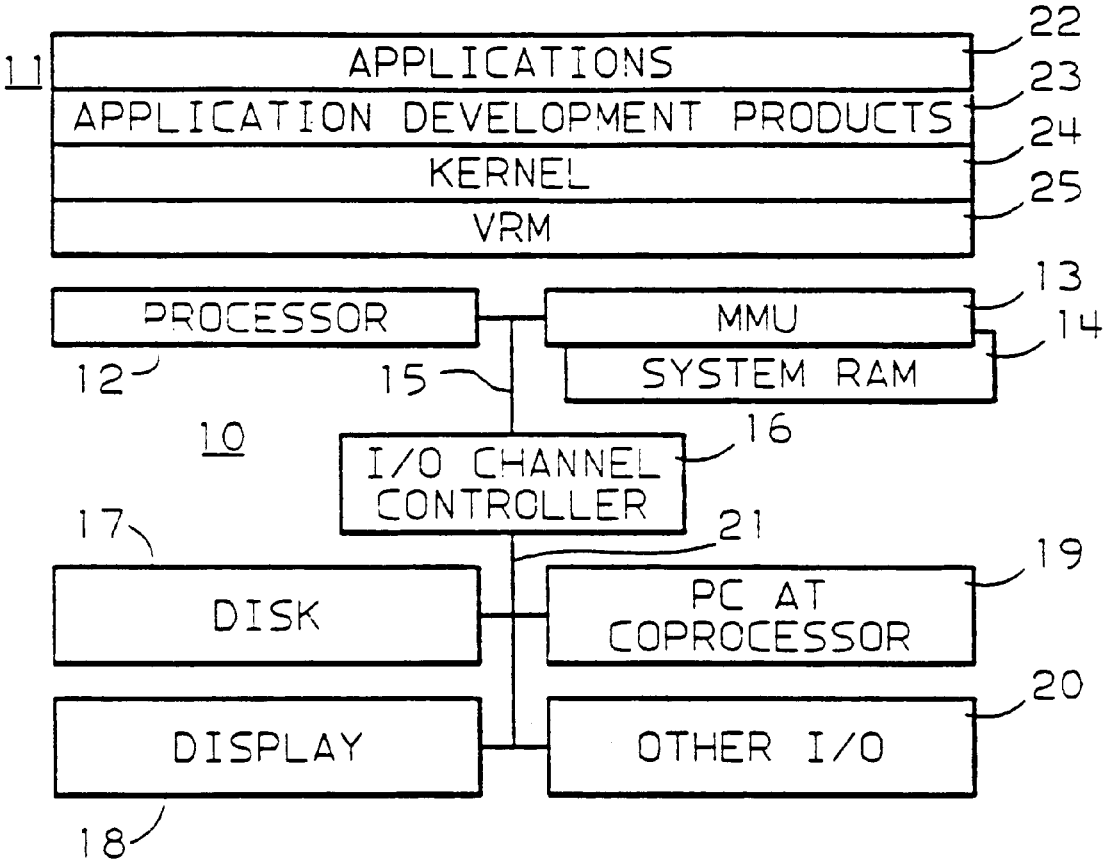
FIG. 1 is a schematic illustration of a virtual memory system in which the method of the present invention may be advantageously employed.

FIG. 1 is a schematic illustration of a virtual memory system in which the method of the present invention is employed. As shown in FIG. 1., the system comprises a hardware section 10 and a software or programming section 11. Hardware section 10, as shown, comprises a processor function 12, a memory management function 13, a system memory function or RAM 14, system bus 15, an Input/Output Channel Controller (IOCC) 16, and an Input/Output bus 21. The hardware section further includes a group of I/O devices attached to the I/O bus 21 through the IOCC 16, including a disk storage function 17, a display function 18, a co-processor function 19, and block 20, representing other r1/O devices such as a keyboard or mouse-type device.

The program section of the system includes the application program 22 that is to be run on the system, a group of application development programs 23, or tools to assist in developing new applications, an operating system kernel 24, which, for example, may be an extension of the UNIX* system V kernel, and a Virtual Resource Manager program 25, which functions to permit a number of virtual machines to be created, each of which is running a different operating system, but sharing the system resources. The system may operate, therefore, in a multi-tasking, multi-user environment which is one of the main reasons for requiring a large virtual memory type storage system.

*Trademark of A.T. and T.

Figure 2:
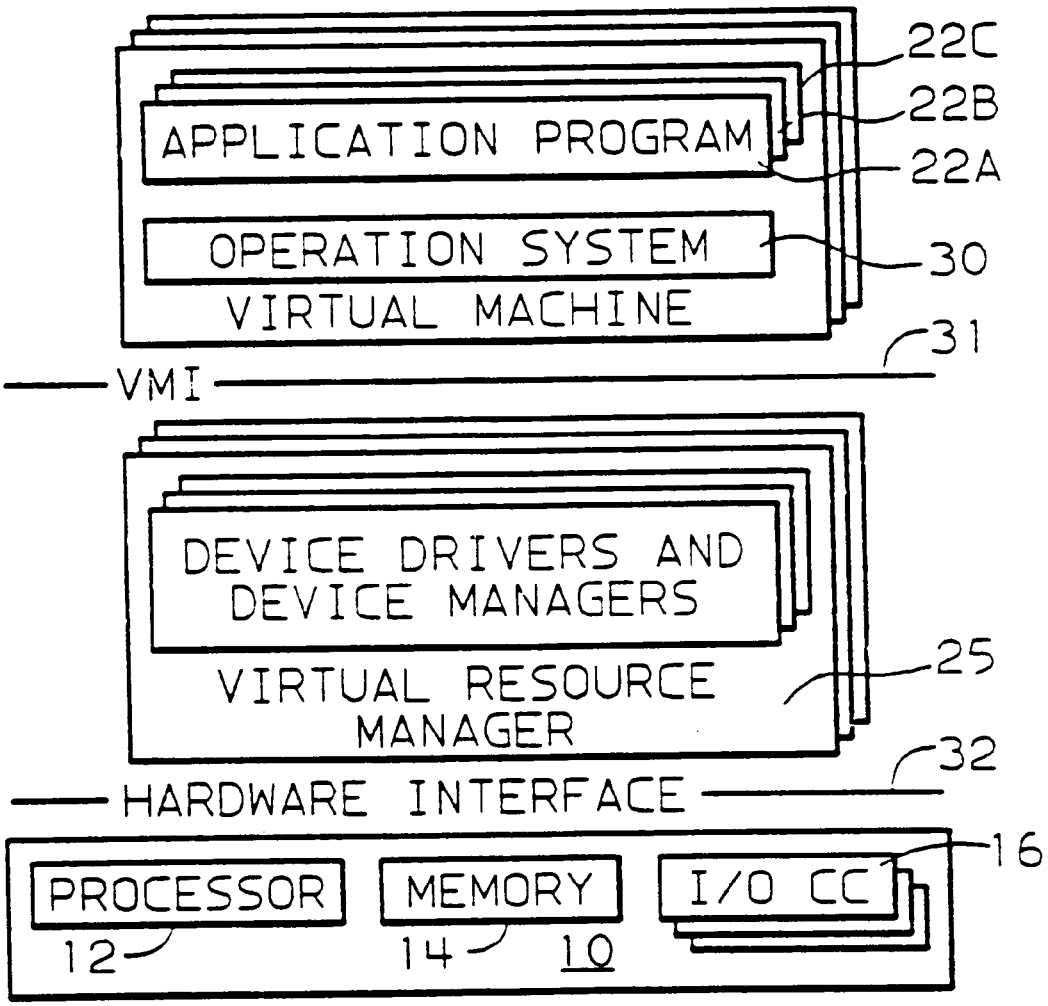
FIG. 2 illustrates the interrelationship of the Virtual Resource Manager shown in FIG. 1 to the data processing system and a virtual machine.

FIG. 2 illustrates the relationship of the Virtual Resource Manager 25 to the other components of the system. As shown in FIG. 2, a virtual machine includes one or more application programs such as 22a–22c and at least one operating system 30. A virtual machine interface 31 is established between the virtual machine and the VRM 25. A hardware interface 32 is also established between the VRM 25 and the hardware section 10. The VRM 25 supports virtual memory. It can be assumed, for purposes of explanation, that the memory capabilities of the hardware shown in FIG. 1 includes a 24 bit address space for system memory 14, which equates to a capacity of 16 megabytes for memory 14, and a 40 bit address space for virtual memory, which equates to 1 terabyte of memory. A paged segmentation technique is implemented for the Memory Management Unit 13, so that the total virtual address space is divided into 4,096 memory segments, with each memory segment occupying 256 megabytes.

Figure 3:
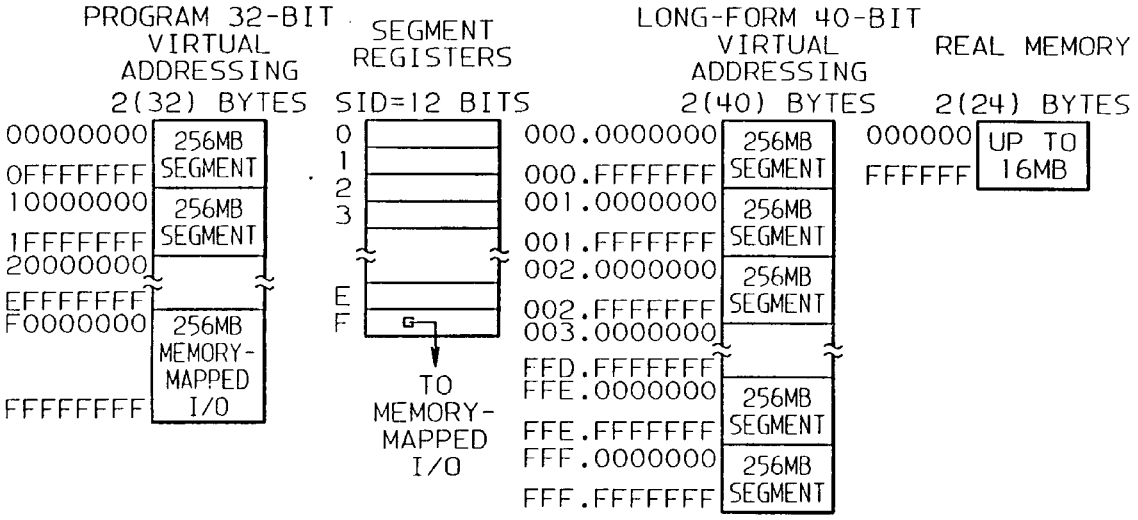
FIG. 3 illustrates the virtual storage model for the system shown in FIG. 1.

FIG. 3 illustrates the virtual storage model. The processor 12 provides a 32 bit effective address which is specified, for example, by the application program. The high order 4 bits of the 32 bit address functions to select 1 of 16 segment registers which are located in the Memory Management Unit (MMU) 13. Each segment register contains a 12 bit segment ID section, along with other special control-type bits. The 12 bit segment ID is concatenated with the remaining 28 bits of the initial effective address to provide the 40 bit virtual address for the system. The 40 bit virtual address is subsequently translated to a 24 bit real address, which is used to address the system memory 14.

The MMU 13 utilizes a Translation Look-aside Buffer (TLB) to contain translations of the most recently used virtual addresses. Hardware is used to automatically update TLB entries from main storage page tables as new virtual addresses are presented to the TLBs for translation.

Figure 4:
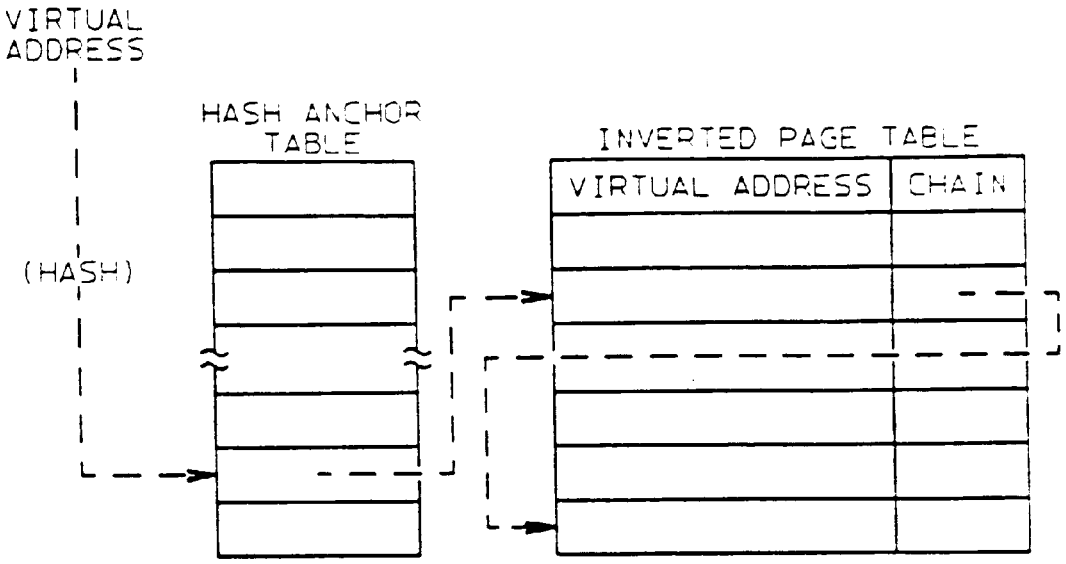
FIG. 4 illustrates conceptually, the TLB reload function of the system shown in FIG. 1.
Figure 5:
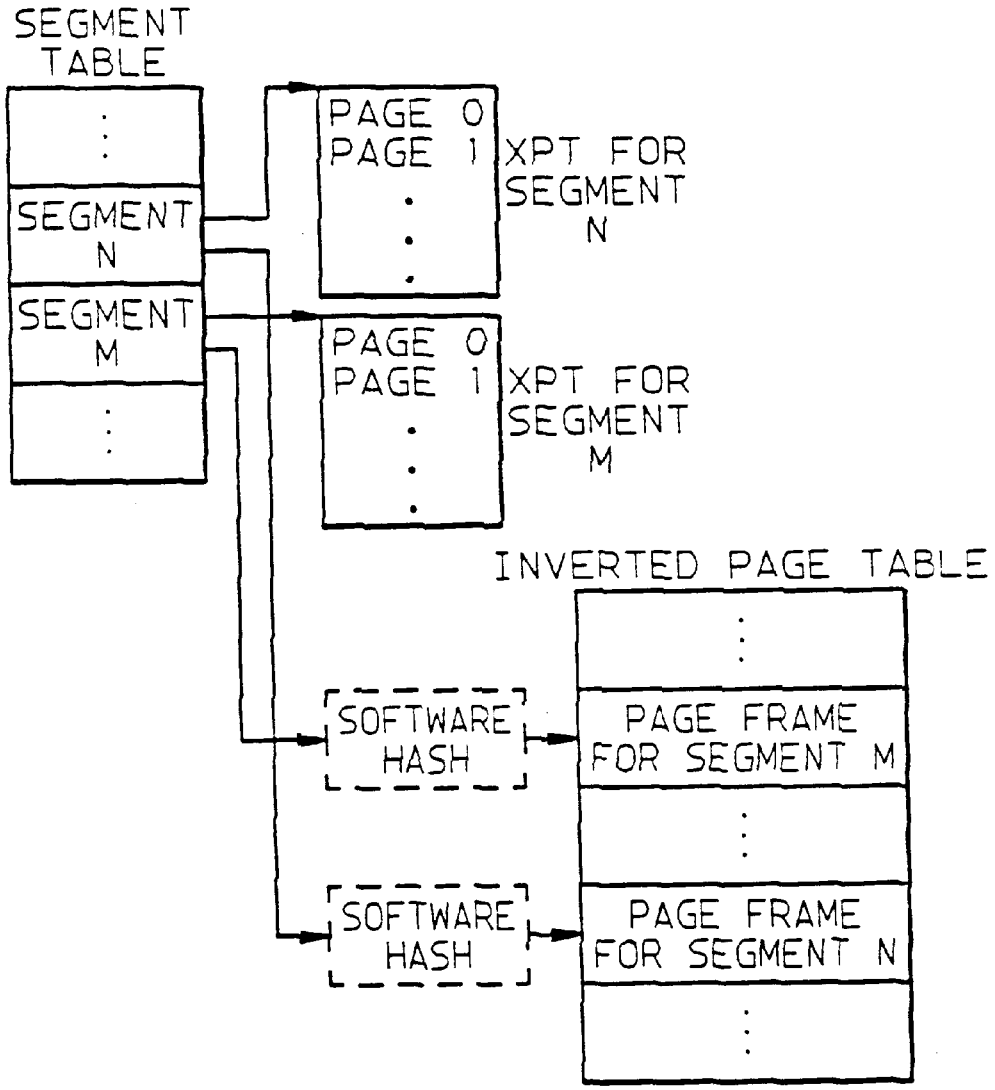
FIG. 5 illustrates some of the major data structures employed by the system shown in FIG. 1.

FIG. 4 illustrates conceptually, the TLB reload function.

The 40 bit virtual addresses are loaded into the TLB by looking them up in an Inverted Page Table (IPT), as shown in FIG. 4. The table is "inverted" because it contains one entry for each real memory page, rather than one per virtual page. Thus, a fixed portion of real memory is required for the IPT, regardless of the number of processes or virtual segments supported. To translate an address, a hashing function is applied to the virtual page number (high order part of the 40 bit virtual address, less the page offset) to obtain an index to the Hash Anchor Table (HAT). Each HAT entry points to a chain of IPT entries with the same hash value. A linear search of the hash chain yields the IPT entry and, thus, the real page number which corresponds to the original 40 bit virtual address. If no such entry is found, then the virtual page has not been mapped into the system, and a page fault interrupt is taken.

The function of the Page Fault Handler (PFH) is to assign real memory to the referenced virtual page and to perform the necessary I/O to transfer the requested data into the real memory. The system is, thus, a demand paging type system.

When real memory becomes full, the PFH is also responsible for selecting which page of data is paged out. The selection is done by a suitable algorithm such as a clock page replacement algorithm, where pages are replaced based on when the page was last used or referenced. Pages are transferred out to disk storage.

Virtual Memory Manager Data Structures

The characteristics of the Virtual Memory Manager data structures will now be described.

Segment Table: The Segment Table (SIDTABLE) contains information describing the active segments. The table has the following characteristics. The table is pinned in real memory and its size is predetermined. It must be word-aligned in memory, and the segment table must be altered in a paging subsystem critical section.

External Page Table. The External Page Table (XPI) describes how a page is mapped to the disk. There is one XPT entry for each defined page of virtual memory. The XPT entries for a segment are allocated as continuous entries when the segment is created. The XPT entries for a small segment, that is one that is less than 1 megabyte, do not cross an XPT page boundary. The XPTs for a large segment, those larger than 1 megabyte, are aligned at the start of an XPT page. The XFT entries are allocated in units of 32 entries which will map 65,536 bytes (64K) of virtual memory. Each entry requires 4 bytes. The table has the following characteristics. Only XPT root entries must be pinned into memory. Its size is predetermined and it must be word-aligned. The virtual page number is the index into the XPT table. The XPT must be altered only in a Paging Subsystem critical section.

Inverted Page Table: The Inverted Page Table (IPT) describes the relationship between virtual addresses and real addresses as discussed previously. The IPT consists of two arrays. The first one is primarily defined by the memory management unit, and contains the information that controls the translation function. The second array contains the Paging Subsystem page state information, used to control page fault processing. This array has the following characteristics. It is pinned, and its size is determined by the real memory size which is set at the Initial Program Load time (IPL). It is aligned according to real memory size. The real page number is the index into the IPT. Like the previous structures it must be altered in a Paging Subsystem critical section. Each real page frame has an entry in the IPT. All pages are on one of three lists.

There is one main list for each valid segment. It is doubly linked and anchored in the segment control block. This list links together all of the page frames assigned to the segment with a valid virtual address and for which there may be a valid Translation Look-aside Buffer (TLB) entry.

There is one system-wide free list that links together the page frames that may be reassigned. This doubly linked, circular list is anchored in the IPT entry for page one. Pages on this list do not have a valid TLB entry, and accesses to them will always result in a page fault. Pages may be on both the main list and free list. This is done so that the pages may be released without searching the free list. Unnamed (unhashed) pages are put at the head of the list, and named (hashed) pages are put at the tail.

There is one system-wide I/O list that links together all of the pages currently being read or written to the disk. This doubly linked, circular list is anchored in the IPT entry for page two. Pages on this list do not have a valid TLB entry, and accesses to them will also result in a page fault. There must be only one page I/O list to ensure that I/O is processed first-in, first-out by block, even if non-first-in, first-out disk scheduling is performed.

Notification Control Block: A Notification Control Block (NCB) contains the information required to notify a virtual machine of the completion of an asynchronous paging request. The asynchronous request can be either a purge page range Service Call (SVC), or a page fault when asynchronous acknowledgement is allowed. An NCB is a self-describing control block in the system control block area Its identifier field can be used to differentiate it from other types of control blocks in the system control block area. This is required since NCBs are queued on the same list as Process Control Blocks (PCBs). An NCB is pinned and allocated in the system control block area when needed. Like the previous structures, it must be altered in a Paging Subsystem critical section. An NCB is only allocated when the Page Fault Handler is performing a function on behalf of a process and, therefore, will not cause the system to abnormally terminate due to insufficient system control blocks.

Page Fault Wait Lists: The Virtual Memory Manager can place a process either internal or virtual machine on one of three circular wait lists.

There is one page I/O wait list for each frame in the system A page's I/O wait list in anchored in the page's IPT entry and links together the Process Control Blocks (PCBs) of the processes synchronously waiting for I/O to complete to the page, and the NCBs of the processes asynchronously waiting for I/O completion notification. A process is placed in a page's I/O wait list when it reclaims the page with I/O in progress or it initiates a page in I/O as a result of a page fault.

There is one global system free page frame wait list. It links together the PCBs or NCBs for the processes that are waiting for a free page frame. This list is processed first-in, first-out. A process is placed on this list when it requires a free page frame and there is not one available. The processes' PCB is enqueued on the list for synchronous waits and an NCB is enqueued on the list for asynchronous waits.

Lastly, there is one global system page I/O wait list. It links together the PCBs or NCBs for the-processes that are waiting for all page out I/O less than or equal to a specific page I/O level. This list is sorted by a page I/O level. A process is placed on this list by several of the Virtual Memory Manager service calls to ensure that the contents of the disk match the contents in memory. A PCB is enqueued on the list for synchronous requests or an NCB is enqueued on the list for asynchronous requests. Note that with non-first-in, first-out disk scheduling, the page I/O level may result in the process waiting longer than is required.

Paging Mini-Disk Table: The paging mini-disk table controls the translation of Virtual Memory Manager slot numbers into the mini-disk I/O Device Number (IODN) and logical block number. The number of entries in this table define the maximum number of mini-disks that the Virtual Memory Manager can perform paging operations to. This array has the following characteristics. It is pinned, its size is predetermined, and it is word-aligned. The paging space mini-disk entries are allocated at system initialization and must be the first entry/entries in the table Mapped page range service calls allocate an entry for mapped mini-disks. The most significant bits of the disk address are the index into this table As in the previous data structures, it must only be altered in a Virtual Memory Manager critical section.

Disk Allocation Bit Map: The Virtual Memory Manager maintains a bit map for each paging space mini-disk. Each bit indicates if its page is allocated or free. Bad slots are marked as allocated when the mini-disk is opened at system initialization. This array has the following characteristics It is not pageable, the paging space is allocated at page out time, the least significant bits of the disk address are the index into this array, and as with the previous structures, it must be altered only in a Virtual Memory Manager critical section.

Paging Device Extensions: One Paging Device Extension (PDX) exists for each paging space that the Virtual Memory Manager supports. A PDX is an extension for a paging space entry in the paging mini-disk table. The Virtual Memory Manager manages paging space and the PDX is what is used to guide it in that management. The attributes of the PDX are; it is pinned and it is allocated from the system control block area at system initialization. It is linked together in a list and anchored by a global pointer, and as previous structures, it must be altered only in a Virtual Memory Manager critical section. PDXs are not dynamically allocated. System initialization allocates all PDXs and initializes them.

Page Fault Processing Synchronous page fault processing is the traditional type of page fault processing. In this operation, the faulting process is forced to wait until the I/O required to resolve the page fault is completed. The Virtual Memory Manager restarts the process at the completion of memory I/O request. When redispatched, the process will either page fault, in which case additional I/O will be scheduled to resolve the fault, or will not page fault, in which case the page fault was resolved. There are two major advantages to this type of page fault processing. First, the Virtual Memory Manager does not need to maintain a page fault state data structure to tell it how to restart the page fault processing for the page. Secondly, this type of a design is more compatible with the dynamic nature of a demand paging systems.

The VMM which executes within the VRM has no concept of the tasks, structures, or environment of tasks executing within a virtual machine. Therefore, the Virtual Memory Manager cannot effectively manage these tasks through traditional synchronous page fault processing. The concept of asynchronous page fault processing with notification is used to overcome this limitation. In general, a virtual machine is informed of page faults through a "page fault occurred" machine communication interrupt. Subsequently, the virtual machine receives a "page fault cleared" machine communication interrupt so that it can put its faulting task back on its ready task list. This allows page faults to be processed asynchronously With respect to the execution on the virtual machine. The viral machine can force synchronous page fault processing by disabling page fault notification. It should be noted that page fault cleared interrupts cannot be directly disabled by a virtual machine. A page fault cleared interrupt is always given when the I/O is complete for a fault that has resulted in a page fault occurred interrupt. Page fault cleared interrupts can be indirectly disabled by disabling page fault occurred interrupts.

Synchronous Page Fault Processing: For synchronous faults, the Process Control Block (PCB) of the process that faulted is placed on either the page's I/O wait list or the free page frame list when the I/O is required. The process is placed on the page I/O wait list when the Virtual Memory Manager initiates I/O for the page or I/O for the page was already in progress. The process is placed on the free page frame list when there are no free page frames available to perform the I/O into.

Asynchronous Page Fault Processing: When an asynchronous page fault occurs, the faulting virtual machine is notified of the segment identifier is faulted on, and the virtual address rounded down to the nearest page boundary. It is important to note that notification is not given for the address that the virtual machine faulted on, but for that page. For example, if a virtual machine faults on addresses x'806', x'856', x'87'E, it will get three page fault occurred notifications for x'800' and one page fault cleared notification for x'800'. A Notify Control Block (NCB) is allocated and chained to the page's I/O wait list when I/O is required. This is the same chain that PCBs are chained onto. The PCBs and NCBs are typed so it is possible to tell them apart. A PCB is chained for a synchronous fault and an NCB is chained for an asynchronous fault.

If the notification was given because of a page fault on the External Page Table (other than the original fault), then the Notification Control Block is chained off the IFT that the XPT is paged into, but the address of the original fault is in the Notification Control Block.

The free frame wait list case is a special case. The virtual machine is notified and its Notification Control Block is chained, first-in, first-out, onto the free frame wait list along with PCBs. The first page out that causes a frame to be freed-up when this NCB is at the head of the free frame wait list will cause notififcation to be given.

Page Fault Occurred Notification: A page fault occurred interrupt is generated by the page fault handler upon determining that an asynchronous fault has occurred and I/O is required. No internal VRM queue element is required to perform this function. The page fault handler actually swaps the virtual machine's (PSB) and execution level. The premise that allows this is that page faults on machine communications or program check levels are processed synchronously, without notification. This implies that the interrupt does not need to be queued because the virtual machine can always take page fault occurred interrupts.

Page Fault Cleared Notification: When the I/O for a page fault is complete, the Virtual Memory Manager will be called to clean up. The page fault complete interrupt is queued to the virtual machine by the VRM queue management function. This implies the need for a queue element. The Notificaton Control Block is used for that function.

Asynchronous Page Fault Scenario: A page fault is considered complete when each I/O it generates completes. A virtual machine will get 'n' total page fault occurred interrupts, and 'n' page fault complete interrupts for a page fault that requires 'n' I/Os to satisfy. Example (n=3 here): Assume that the virtual machine faults asynchronously on a page that exists, but is not in memory, there are no free frames in memory to page it into, and the virtual memory manager faults on the XPT for the original page. The following lists the order of events (Note that this scenario is not the typical case):

1. VM Page Faults
2. VMM Enqueues Page out requests to build up free page frame list
3. VMM Notifies virtual machine of Original Page Fault
4. VM is Dispatched (presumably it will task switch or wait)
5. Page out I/O completes
6. VMM Notifies virtual machine that the original Page Fault is resolved
7. VM is Dispatched
8. VM Page Faults again on the same address
9. VMM Page Faults on XFT
10. VMM Enqueues Page in request for that XPT
11. VMM Notifies virtual machine of Original Page Fault
12. VM is Dispatched (presumably it will task switch or wait)
13. The XPT Page in I/O completes
14. VMM Notifies virtual machine that the original Page Fault is resolved
15. VM is Dispatched
16. VM Page Faults again on the same address
17. VMM Enqueues Page in request for the page faulted on
18. VMM Notifies virtual machine of the Page Fault
19. VM is Dispatched (presumably it will task switch or wait)
20. The Page in I/O completes
21. VMM Notifies virtual machine that the original Page Fault is resolved
22. VM is Dispatched Purge Page Range Notification: There is another way in the system to get a notification of I/O complete from the Virtual Memory Manager. This is on the asynchronous forced write option of the Purge Page SVC One machine communications interrupt is presented to the Virtual machine upon completion of the I/O for the Purge Like page fault complete interrupts, this is given to the virtual machine, regardless of whether the virtual machine enables page fault notification.

The way it works is an NCB is chained on the page I/O level wait list, along with PCBs. In the NCB is marked the page I/O level that must be achieved before the purge I/O can be considered complete. When that page I/O level is attained, the virtual machine will be notified.

Page Fault Handler. A large function of the page fault handler, namely the way it handles synchronous and asynchronous page faults is discussed in "Page Fault Processing." In the following section, where statements are made such as: "the faulter is notified," this means that if the faulter faulted asynchronously, it is notified, otherwise it is un-readied, as per previously described rules. This section describes the actual process that the page fault handler goes through to resolve a fault.

The page fault handler runs as an extension of the program check handler, at a lower interrupt level; below all interrupting devices. It runs in a back-track state, thus allowing it to page fault on the Virtual Memory Manager data structures.

When the page fault handler is entered, it immediately saves information above the fault, such as the virtual address. The reason that it does this is, if it page faults within itself, and that fault needs to do I/O, the page fault handler must know what address to give to the virtual machine for asynchronous notification. This implies that no page faults are allowed in the window between where the page fault handler has been backed out because of a page fault and where it is called again to service its own fault.

There are several important steps into which the page fault handler may be broken into:

Page Reclaim

If the page can be reclaimed, then the page fault handler is done. If page in or page out I/O is in progress to the page, then the faulter is chained onto the page's I/O wait list. Upon completion of the I/O, a test is made to see if any process is waiting on the frame and if so, it is notified. Reclaim, therefore, is split across the page fault handler and page fault end. If the page is on the free list, then the faulter is redispatched after the page frame is made accessible. The faulter is not notified or forced to wait.

Building up the Free Page List

If the free list is found to be below a lower threshold, then page outs are initiated to built it up to an upper threshold. These thresholds are system tuning parameters. If the free list is still empty after attempting to replenish it, then the faulter will be notified of the original fault.

Clock with second change is the technique used to select pages to be replaced.

Processing the Fault

The page fault handler involves itself with most of the Virtual Memory Manager structures, but most importantly, it examines the XPT for the page faulted on, and the page fault handler may fault at this time. It also allocates a paging space disk slot for the page.

Page Fault End: This procedure handles all I/O completion interrupts for the Virtual Memory Manager. It is scheduled for execution by the queue manager when the hard file device driver dequeues a Virtual Memory Manager request. Note that execution of this routine is delayed until the completion of any preempted Virtual Memory Manager critical section. Page fault cleared notification is given by this procedure according to the rules set in "Page Fault Processing." This procedure may not page fault and, therefore, no references are allowed to XPTs or other pageable data structures. There are two types of I/O that can complete for the Virtual Memory Manager.

Page in

Page out

All processes waiting on the frame are readied/notified. Also, the page I/O level is updated. This is a count of all the I/O operations that have completed. All processes waiting on a page I/O level less than or equal to the updated page I/O level are readied/notified when the oldest I/O operation completes. The frame is made accessible by validation the IPT tag word for all page in completions and reclaimed page out completions of an unreleased page. Otherwise, the frame is placed on the free list.

This procedure attempts to replenish the system control block area when the number of free system control blocks is below its upper threshold and a free frame exists. All processes waiting on a free system control block are then readied. This procedure is also responsible for waking up processes waiting for a free frame. A free frame is assigned to the process that has been waiting the longest for a free frame. This processes is then notified/readied.

Paging Space: The Virtual Memory Manager supports paging to one or more paging spaces. Currently, the only paging device supported is a hardfile, however, the design has been made relatively flexible in this area for future expansion. A requirement of all paging spaces is that they be formatted for 512 byte blocks.

Paging Space Initialization: All paging spaces MUST be known to the Virtual Memory Manager at system initialization. If a user creates a paging space using a Mini-disk Manager, then, before the Virtual Memory Manager will page to it, the system must be re-IPLed, or reinitialized. The reason for this is that system initialization is the only time that the Virtual Memory Manager paging space data structures are built. All paging spaces, as well as the disk allocation bit map are set up at Mini-disk Manager initialization time. The Mini-disk Manager queries all mini-disks, and when it find a paging space mini-disk, it calls a routine which effectively "defines" a paging space to the VMM. Before calling the define paging space routine, the Mini-disk Manager opens the paging mini-disk (it will be left open). The way that the define paging space routine works is as follows:

1. Allocate a PDX for the paging space.
2. Initialize the PDX.
3. Initialize the paging mini-disk table.
4. Insert the new PDX onto a linked list of all existing PDXs.
5. Each PDX is made to point to its paging mini-disk table entry and vice versa.
6. Set up the disk allocation bit map (temporary disk map for this paging space There is one disk allocation bit map, and it is partitioned among all paging spaces. The reason for having one bit map, rather than multiple, is that by packing paging spaces into one bit map, it will improve the locality of reference to the bit map. The XPTs for the bit map are set such that the bit map is initially all logically zero. If a paging space is not a multiple of 64K, then system initialization rounds the size up to the next 64K boundary, and marks the blocks (bits) in between as allocated. This requires the ability of system initialization to a first reference page fault at this time After defining a paging space, the Mini-disk Manager then checks for bad blocks on the paging space. If a bad paging space block is found, the Mini-disk Manager will call a routine to mark the bad paging spaces as allocated in the Virtual Memory Manager temporary disk map. This way, the Virtual Memory Manager will never use them. The Mini-disk Manager will then do bad block relocation on that paging space in the future.

Paging Space Management: Paging disk blocks are allocated one at a time, in a circular fashion per paging space. A pointer is kept to the last place allocated at in each paging space. On the next allocation in that particular paging space, the search for an empty slot starts at the last allocated slot and incrementally runs through the paging space rewrapping around at end). The idea behind allocating in this fashion is to improve page out affinity, and page ahead. The circular pointer through a paging space can be thought of as pointing to the "oldest" spot on that paging space, or, in other words, the spot that was written out the longest ago. It is a reasonably good probability that that disk slot will be free now (since it was allocated a long time ago). All disk slots are allocated at page out time, so if a large purge page range is performed, causing a lot of slots to be allocated at once, this will allocate them close together. This is assuming that the purge is being done to page out a working set of a particular process, or entity in the virtual machine. When that process becomes active again, its working set is close together on disk, minimizing arm movement, and maximizing page ahead efficiency.

In the presence of more than one paging space, they each, individually, behave as previously described. The Virtual Memory Manager disk allocation will decide which paging mini-disk to allocate a block to. The disk scheduler will keep track of where the disk arm is (approximately). The Virtual Memory Manager utilizes this by attempting to allocate on the paging space whose point at last allocation is closest to where the disk array is (for all disks).

Virtual Memory Manager SVCs: The Virtual Memory Manager SVCs all execute as extensions of the virtual machine. These SVCs can result in explicit I/O such as a page out of a purged page or implicit I/O such as page faults on code, stack, or data. All I/O for synchronous SVCS will place the virtual machine in a synchronous page fault wait state until the I/O is complete. Only implicit I/O for asynchronous SVCs will place the virtual machine in a synchronous page fault wait state until the I/O is complete. Explicit I/O will be initiated and the virtual machine notified upon completion.

Special Program Check Error Processing: Program check errors that occur while executing code within a virtual machine are reported to the virtual machine via a program check virtual interrupt. Program check errors that occur while executing within the VRM result in an abnormal system termination. VRM SVCs execute within the VRM and perform functions on behalf of a virtual machine. Therefore, the program check handler looks at a value in low memory to determine if errors that occur within VRM SVC code are to be reported to the virtual machine as a program check virtual interrupt with the old LAR specifying the SVC or if the errors are an abnormal system termination.

Selected VMM SVCs use this facility to save path length by not checking for error conditions when accessing parameter lists. The program check handler performs the error recovery for them.

Virtual Memory Manager Services: All Virtual Memory Manager services execute synchronously with respect to the caller. Several of these services can result in page faults in which case the process of the caller is forced to wait for the page fault to be resolved.

Asynchronous vs. Synchronous Page Faults: The VRM supports both synchronous and asynchronous page fault processing for virtual machines. With synchronous page fault processing, the entire virtual machine is forced to wait until the page fault is resolved. With asynchronous page fault processing, the virtual machine is allowed to dispatch other tasks. Only the faulting task is forced to wait until the page fault is resolved. Because of this, any operation that results in synchronous page fault processing will tend to lower the number of concurrent taks that can be executed while any operation that results in asynchronous page fault processing will tend to maximize the number of concurrent tasks that can be executed.

In summary, the improved method serializes three system events described above as follows: page fault interrupts are processed to permit another page fault interrupt. The page fault processing is coded, such that if an interrupt does occur during a critical section, the process is re-started at some previous point, which is recorded (back-tracking). In addition, the section is coded, such that pages are "touched" to insure that they are in memory before any change to the page or its data structure is initiated Interrupts signalling the fact that a page fault I/O has been completed, are not enabled when the page fault process is running. These paging I/O completion interrupts are effectively placed on a wait list which is serviced at a lower priority.

Supervisory calls to the paging subsystem which operate to change page states are serialized secondly, relative to paging I/O interrupts, by establishing a backtrack state at the entry of a critical section. I/O interrupts are allowed, but I/O completion interrupts are disabled. Therefore, relative to these I/O completion interrupts, paging services are second, putting the I/O completion interrupts third in the serial change. If a page fault interrupt occurs in a service, the paging service supervisory call is re-started at the beginning of the critical section where the status was saved. I/O completion interrupts are disabled, so that these are processed last at a lower priority level.

Figure 6A:
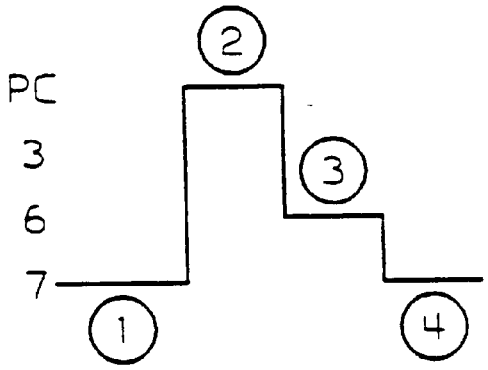
FIG. 6a–6g are a series of charts, illustrating on the vertical scale, the interrupt level priorities of the system and on the horizontal scale, a sequence of different system events.

FIG. 6a illustrates a basic page fault without an I/O operation. In these figures, the horizontal axis represents time, while the vertical axis represents the various priority interrupt levels at which the system operates. The circled number represents a time period during which an operation occurs.

In FIG. 6a during period 1, Process A references a virtual address that is not in memory and the hardware responds with a program check interrupt.

During period 2, the program check handler determines that it is a page fault, and initiates the VMM Page Fault Handler critical section.

During period 3, the Page Fault Handler determines that the fault can be processed without I/O. It resolves the fault and redispatches Process A.

During period 4, Process A executes the faulting instruction successfully, and proceeds.

During periods 2 and 3, no processes can be dispatched, and therefore, the VMM Page Fault Handler is serialized with respect to VMM services executing within the process.

Figure 6B:
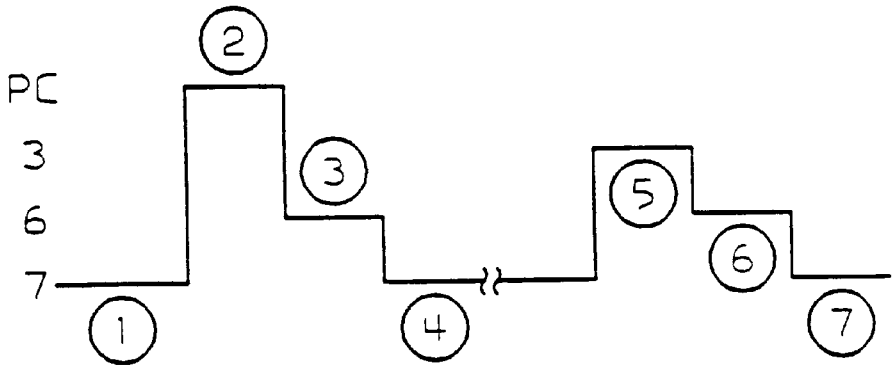

FIG. 6b illustrates a page fault requiring an I/O operation.

With reference to FIG. 6b during period 1, Process A references a virtual address that is not in memory and the hardware responds with a program check interrupt.

During period 2, the program check handler determines that it is a page fault, and initiates the VMM Page Fault Handler critical section.

During period 3, the Page Fault Handler (PFH) initiates an I/O operation to the secondary store to resolve the fault.

During period 4, other activity can occur in the system, since the system must wait for the I/O operation to complete.

During period 5, the disk I/O completes, level 6 is set pending, and a request is placed on the VMM disk I/O completion queue.

During period 6, the VMM disk I/O completion critical section makes Process A ready.

During period 7, the highest priority process that is on the I/O completion queue list is dispatched.

During periods 2 and 3 and periods 5 and 6, no processes can be dispatched and, therefore, the Page Fault Handler and VMM disk completion critical sections are serialized with respect to VMM services, executing within processes.

Figure 6C:
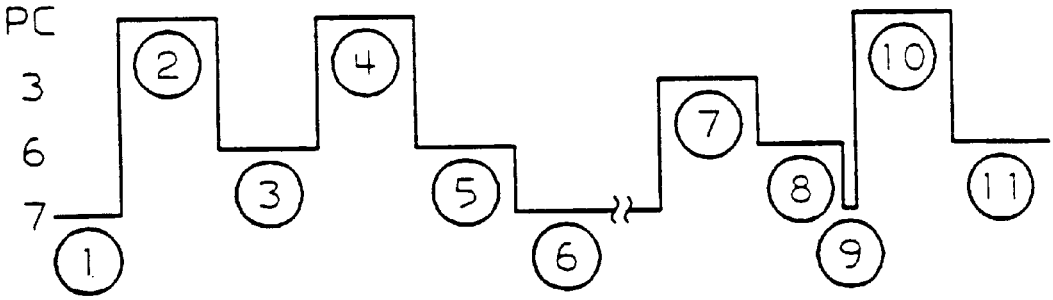

FIG. 6c illustrates a page fault involving a backtracking operation.

During period 1, Process A references a virtual address that is not in memory and the hardware responds with a program check interrupt.

During period 2, the program check handler determines that it is a page fault and initiates the VMM Page Fault Handler critical section.

During period 3, the Page Fault Handler page faults while processing the original page fault.

During period 4, the program check handler determines that it is a page fault and initiates the VMM Page Fault Handler critical section.

During period 5, the Page Fault Handler initiates I/O to resolve fault.

During period 6, other activity occurs while waiting for the I/O completion.

During period 7, disk I/O completes, level 6 is set pending, and a request is placed on the VMM disk I/O completion queue.

During period 8, VMM disk I/O completion critical section makes process A ready.

During period 9, the system dispatches the highest priority process. Assuming it was the original process of step 1, it will re-execute and re-fault again.

The rest of the sequence is as occurs in FIGS. 6a and 6b.

The Page Fault Handler is serialized with itself by careful coding where it can page fault and by always restarting the process at the original page fault. This is an example of back-tracking with careful update.

Figure 6D:
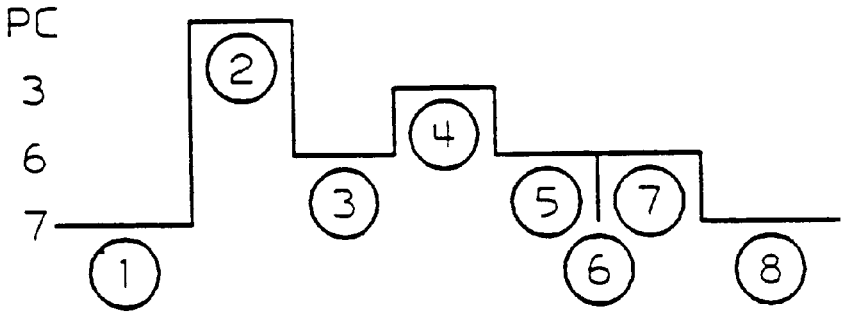

FIG. 6d illustrates a page fault serialized with the VMM disk I/O completion interrupt.

During period 1, Process A references a virtual address that is not in memory and the hardware responds with a program check interrupt.

During period 2, the program check handler determines that it is a page fault and initiates the VMM Page Fault Handler critical section.

During period 3, the Page Fault handler starts processing the fault and is interrupted.

During period 4, the disk completion interrupt completes for the paging request Level 6 interrupt is set and a request is put on the VMM I/O disk completion queue. Note that this is not a VMM critical section, so therefore, the Page Fault Handler is restarted where it was interrupted.

During period 5, the Page Fault handler continues processing the page fault, determines that the fault can be processed without I/O, resolves the fault, and redispatches Process A.

During period 6, the dispatcher attempts to dispatch Process A, but since that takes a pending VMM disk I/O complete level 6 interrupt, so Process A is not dispatched at that time.

During period 7, the VMM disk I/O completion interrupt makes the Process B ready.

During period 8, the higher priority process, either A or B, is executed.

During periods 2–7, no processes can be dispatched and, therefore, the page Fault Handler and the VMM disk I/O completion critical sections are serialized with the VMM services executing within the process. Also, the VMM disk I/O completion critical section does not page fault and is, therefore, serialized with respect to the Page Fault Handler.

Figure 6E:
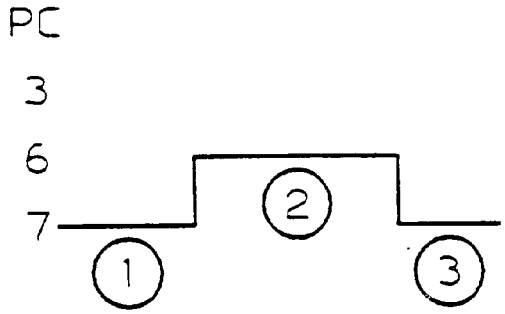

FIG. 6e illustrates a VMM service critical section.

During period 1, a process call for VMM service is executed. The VMM service simulates a level 6 interrupt when it enters a VMM critical section.

During period 2, the VMM critical section executes on level 6, thus preventing other processes from initiating a VMM critical section since they cannot be dispatched to level 6. The VMM critical section simulates an interrupt return when exiting from interrupt level 6.

During period 3, the VMM service returns to the calling application when finished, and the system proceeds executing the original process.

Figure 6F:
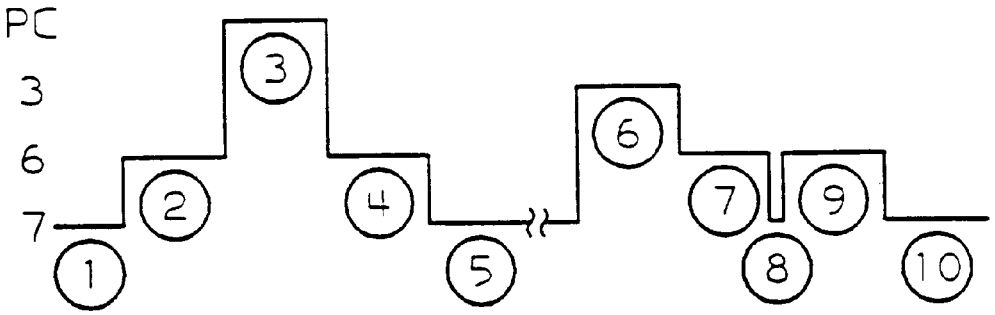

FIG. 6f illustrates a VMM service with a page fault.

During period 1, a process call for VMM service is executed. The VMM service simulates a level 6 interrupt when it enters a VMM critical section.

During period 2, the VMM critical section page faults.

During period 3, the program check handler determines that it is a page fault and initiates the VMM Page Fault Handler critical section.

During period 4, the Page Fault Handler (PFH) initiates an I/O operation to the secondary store to resolve the fault.

During period 5, other activity can occur in the system, since the system must wait for the I/O operation to complete.

During period 6, the disk I/O completes, level 6 is set pending, and a request is placed on the VMM disk I/O completion queue.

During period 7, the VMM disk I/O completion critical section makes process A ready.

During period 8, the process of step 1 is redispatched and a call to the VMM critical section is made. The VMM service simulates a level 6 interrupt when it enters the VMM critical section.

During period 9, the entire VMM critical section executes as in step 2 of FIG. 6e.

During period 10, the VMM service returns to the caller when finished. It then executes under the original process.

The page fault between periods 2–3 is a back-tracking situation. Each VMM critical section is carefully coded to control where a page fault can occur.

Figure 6G:
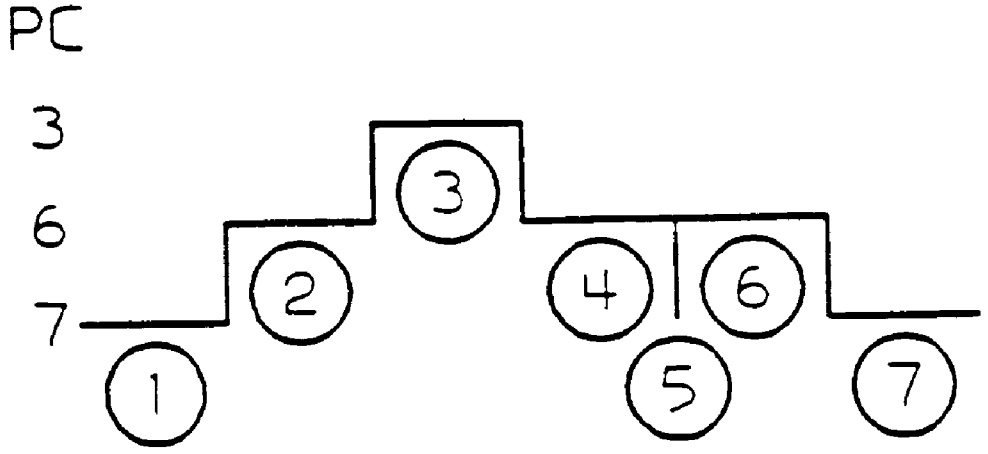

FIG. 6g illustrates a VMM service with a disk I/O completion.

During period 1, a process call for a VMM service is made The VMM service simulates a level 6 interrupt when it enters a VMM critical section.

During period 2, the VMM critical section executes on level 6, thus preventing other processes from initiating a VMM critical section since they cannot be dispatched. The VMM critical section is interrupted.

During period 3, the disk I/O completion interrupt completes from the paging request. A level 6 interrupt is set and a request is put on the VMM disk I/O completion queue. Note that this is not a VMM critical section, so therefore, the VMM critical section is restarted where it was interrupted.

During period 4, the VMM critical section executes on level 6, thus preventing other processes from initiating a VMM critical section since they cannot be dispatched. VMM critical sections simulate an interrupt return when exiting.

During period 5, the dispatcher attempt to dispatch Process A, but since that takes a pending VMM disk I/O complete level 6 interrupt, so Process A is not dispatched at that time.

During period 6, the VMM disk I/O completion interrupt makes the Process B ready.

During period 7, the higher priority process, either A or B, is executed.

While the invention has been particularly shown and described with reference to a particular embodiment, it should be understood by those persons skilled in the art that various changes and modifications may be made without departing from the spirit of the disclosed invention and scope of the following claims.

We claim:

1. In a virtual memory data processing system having a real memory containing a plurality of addresable locations each of which has a different physical address and each of which is capable of storing a page of data, said system further including a plurality of pageable data structures, each of which includes a plurality of entries, each entry containing an address field and a related status field to indicate the current status of a page of data stored at said location having the physical address contained in said related address field of said entry, said status field being updatable by said system to reflect said current status of said related page whenever the status of said related page of data is changed, a method to serialize a plurality of different type system events which operate to change the status of a page of data, and to update said status field of said corresponding entry of said pageable data structure to reflect said change in order to insure the integrity of said data structures, said method comprising the steps of;

(1) coding a first section of code that is executed in response to a first page fault to permit an interrupt for a second page fault and to request an I/O paging operation, said first section of code including a critical section, (2) executing said first section of code to completion prior to a section of code having a lower priority being executed by restarting said first section of code at its critical section after said second page fault is serviced in order to service said first page fault, (3) coding a second section of code that is executed in response to the completion of an I/O operation initiated in response to a page fault, (4) enqueueing on a list an indication of said completion of each said I/O operation, and (5) executing said second section of code after said first section completes executing.

2. A method used in a virtual memory priority interrupt data processing system for updating a page status field of a data structure in response to interrupt signals caused by independent asynchronous system events, comprising the steps of;

(1) executing a Page Fault Handling (PFH) routine at a first interrupt level in response to a page fault interrupt signal, said PFH routing having a critical section that is carefully coded and re-started at a predetermined instruction and, (2) executing a page status change type service call routine at a second priority level in response to a request by a program being executed by said system, including the step of generating a simulated interrupt signal to switch the interrupt level of said system to said first level.

3. The method recited in claim 2 in which said step of generating occurs immediately prior to when said service call routine enters its critical section to thereby serialize subsequent similar service calls relative to each other and subsequent to execution of said page fault handling routine.

4. The method recited in claim 1, further including the step of switching said system to a program check interrupt level in response to an interrupt signal and executing a program check handler routine to determine that said interrupt is a page fault interrupt.

5. The method recited in claim 4, further including the step of switching said system to said first level to execute said PFH routine.

6. The method recited in claim 5 further including the step of assigning said program check interrupt level the highest priority level of said system.

7. A method used in a virtual memory priority interrupt data processing system for updating a page status field of a data structure in response to interrupt signals caused by independent asynchronous system events, comprising the steps of;

(1) executing a Page Fault Handling (PFH) routine at a first interrupt level in response to a page fault interrupt signal, said PFH routine having a critical section that is carefully coded and restarted at a predetermined instruction and, (2) switching said system to a third interrupt level which is higher than said first level in response to an interrupt signal generating in response to completion of an I/O request operation by said PFH routine and, (3) executing an I/O completion routine on said third level which includes the step of generating an interrupt signal for said first level and subsequently completing said I/O request operation after all the interrupts on said first level and above have been serviced by said system.

8. The method recited in claim 7 in which said switching step interrupts said Page Fault Handler routine in a non-critical section and further includes the step of returning said system to said first level to permit said Page Fault Handler routine to complete executing, whereby said Page Fault Handler routine is serialized ahead of said I/O completion routine.

9. The method recited in claim 7 in which said switching step interrupts a service call routine in a non-critical section, and further returns the system to said first level to permit said service call routine to complete executing, whereby said service call routine is serialized ahead of an I/O completion routine, but after a page fault routine.

*10. A method for handling page faults In a virtual memory manager on a computer system utilizing priority interrupts, comprising the steps of:*

*defining as critical sections selected code potions of the virtual memory manager which modify a shared data structure containing virtual memory mapping information, wherein each critical section contains two sections of code for, in sequence, performing the steps of:*

*within the first section, ensuring that all necessary portions of the shared data structure are available for use by the second section without generating a page fault; and*

*within the second section, updating the shared data structure; and*

*executing such defined critical sections as system interrupts, wherein execution of a defined critical section cannot be interrupted except by a higher priority interrupt.*

*11. The method of claim 10, wherein the defined critical sections execute as system interrupts having the lowest interrupt priority level.*

*12. The method of claim 10, wherein a page fault handler routine within the virtual memory manager executes completely as a interrupt.*

*13. The method of claim 12, wherein a page fault is defined as a higher priority interrupt than the priority of the defined critical sections, and wherein the page fault handler lowers its own priority to that of the defined critical sections.*

*14. The method of claim 10, wherein selected service calls, which modify the shared data structure, have only portions thereof defined as critical sections, wherein such portions contain those parts of the service calls which actually modify the shared data structure.*

*15. The method of claim 10, wherein said ensuring step comprises reading the necessary portions of the shared data structure.*

*16. The method of claim 10, wherein I/O requests and completions generate interrupts having a higher priority than the defined critical sections, and wherein, after the I/O operation has been completed, such higher level interrupts generate an interrupt having the same level as the defined critical sections.*

*17. A method for handling page faults in a virtual memory manager on a computer system utilizing priority interrupts, comprising the steps of:*

*defining as critical sections selected code portions of the virtual memory manager which modify a shared data structure containing virtual memory mapping information, wherein each critical section contains two sections of code for, in sequence, performing the steps of:*

*within the first section, ensuring that all necessary portion of the shared data structure are available for use by the second section without generating a page fault by reading the necessary portions of the shared data, structure; and*

*within the second section, updating the shared data structure;*

*executing such defined critical sections as system interrupts, wherein execution of a defined critical section cannot be interrupted except by a higher priority interrupt;*

*on entering a critical section, setting a backtrack point to the beginning thereof; and*

*if a page fault occurs during execution of the critical section, returning to the backtrack point when control is returned from such page fault.*

*18. A method for handling page faults in a virtual memory computer system, comprising the steps of:*

*defining as critical sections selected code portions of a virtual memory manager which modify a shared data structure containing virtual memory mapping information;*

*on entering a critical section during execution, setting a backtrack point at the beginning thereof;*

*within the critical section, ensuring that any memory objects not in main memory may only be accessed when the shared data structure is in a consistent state; and*

*if, during execution of a critical section, a memory object is accessed which is not currently in main memory, reading such object into main memory and restarting execution from the beginning of the critical section.*

*19. The method of claim 19, wherein the defined critical sections execute as system interrupts.*

*20. The method of claim 20, wherein the defined critical sections execute as system interrupts having the lowest interrupt priority level.*

*21. The method of claim 20, wherein a page fault handler routine within the virtual memory manager executes completely as a interrupt.*

*22. The method of claim 20, wherein selected service calls, which modify the shared data structure, have only portions thereof defined as critical sections, wherein such portions contain those parts of the service calls which actually modify the shared data structure.*

* * * * *